G. W. GALE.
CONCRETE SPREADER FOR DITCHES, SIDEWALKS, AND OTHER SURFACES.
APPLICATION FILED DEC. 19, 1910.
992,649.
Patented May 16, 1911.
3 SHEETS—SHEET 3.
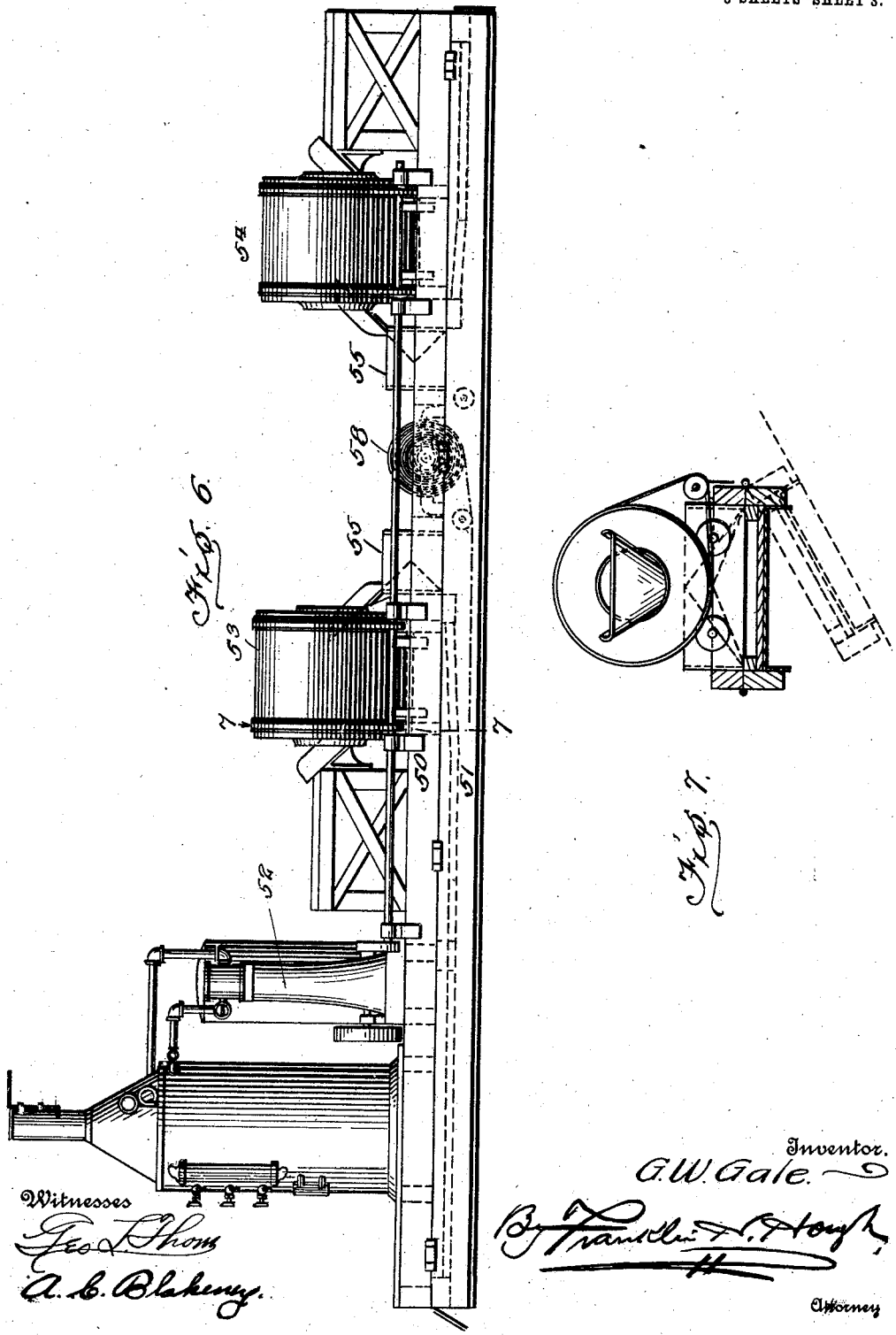

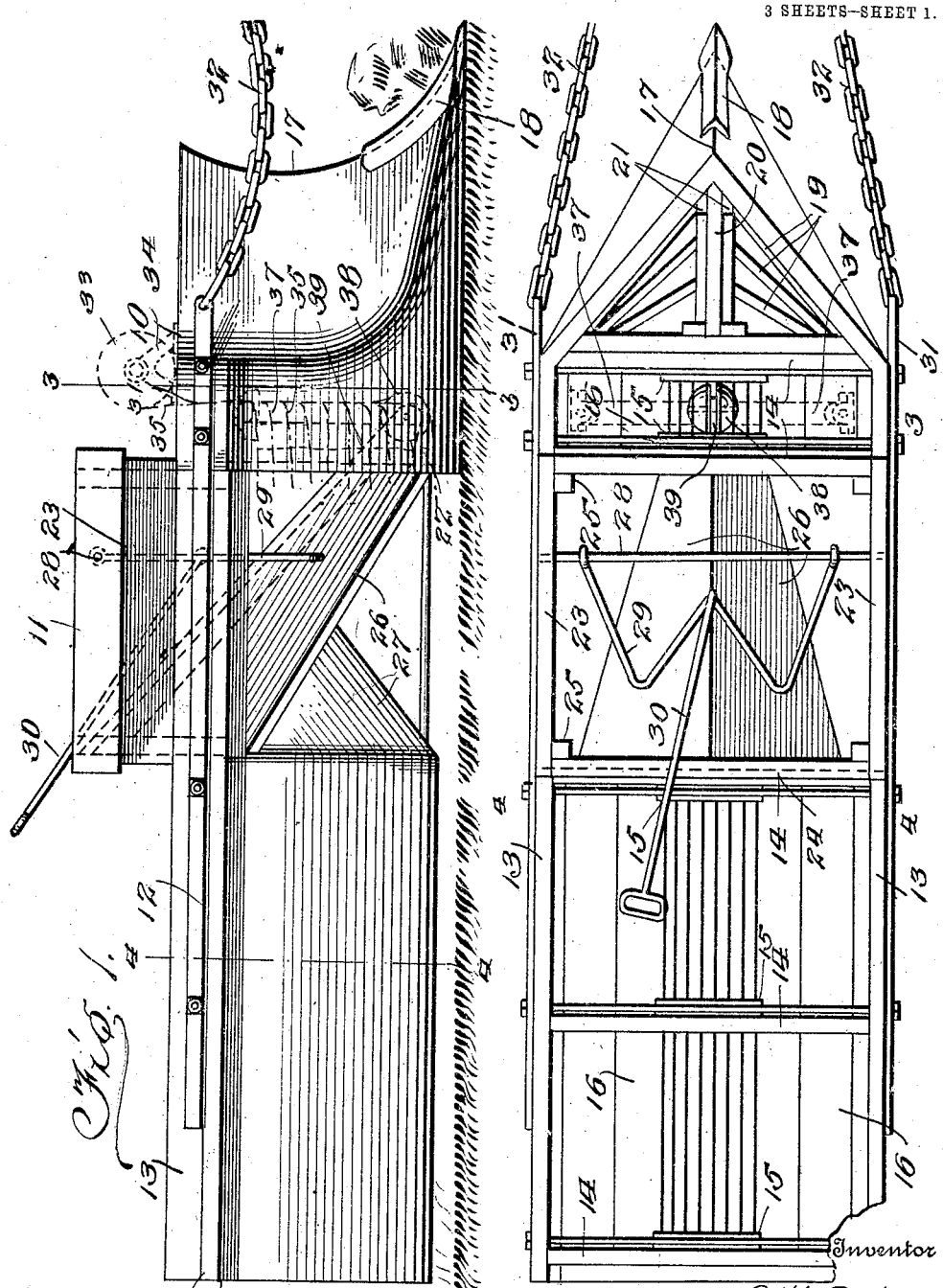

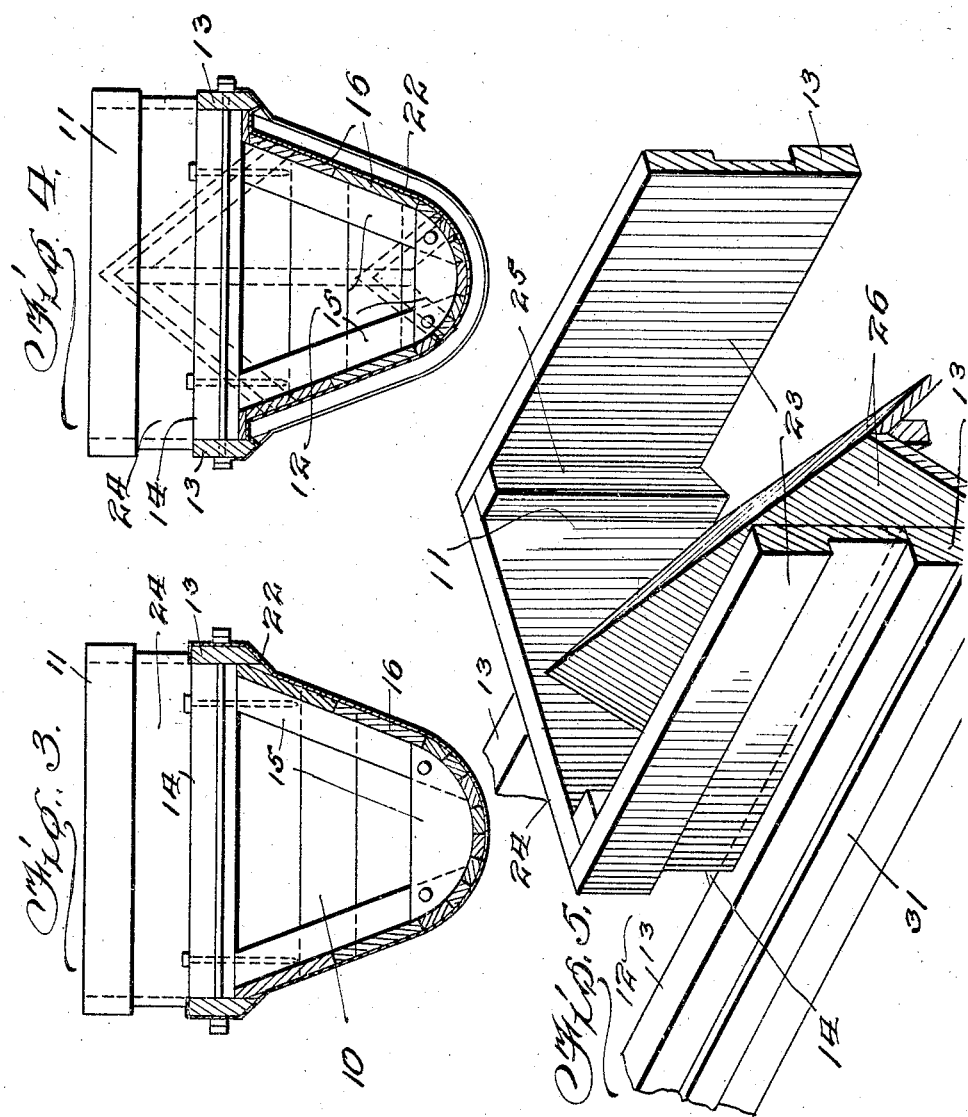

UNITED STATES PATENT OFFICE.

GEORGE W. GALE, OF GREELEY, COLORADO.

CONCRETE-SPREADER FOR DITCHES, SIDEWALKS, AND OTHER SURFACES.

992,649.  Specification of Letters Patent.  Patented May 16, 1911.

Application filed December 19, 1910. Serial No. 598,234

*To all whom it may concern:*

Be it known that I, GEORGE W. GALE, a citizen of the United States, residing at Greeley, in the county of Weld and State of Colorado, have invented certain new and useful Improvements in Concrete-Spreaders for Ditches, Sidewalks, and other Surfaces; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in mortar spreading apparatus designed especially for use in laying large irrigating ditches, reservoirs, making sidewalks, streets, alleys, highways and flat or curved surfaces generally and comprises various details of construction and combinations and arrangements of parts which will be hereinafter fully described and then specifically defined in the appended claims.

I illustrate my invention in the accompanying drawings, in which:—

Figure 1 is a side elevation showing the application of the invention for use in laying irrigating ditches, reservoirs, etc. Fig. 2 is a top plan view of the form shown in Fig. 1. Fig. 3 is a cross sectional view on line 3—3 of Fig. 1. Fig. 4 is a sectional view on line 4—4 of Fig. 1. Fig. 5 is a detail perspective view. Fig. 6 is a view in elevation of a modified form, and Fig. 7 is a cross sectional view on line 7—7 of Fig. 6.

Reference now being had to the details of the drawings by numeral, 11 designates the middle or hopper portion and 12 the after portion of the spreader and smoothing device.

The frame of the apparatus is constructed of longitudinal pieces 13, cross-pieces 14, ribs 15 to which are secured the planking boards 16. The forward end tapers as shown and is concaved as at 17, terminating at its lower end in a plow point 18. The frame of the forward portion of the apparatus is composed of the ribs 19, stem 20 and curved members 21. The framework or planking is covered preferably by sheet metal, designated by numeral 22, and forms a smooth surface for the wall of the ditch, reservoir or other object in connection with which the apparatus is used. The hopper is mounted upon the longitudinal bars 13 and two of the cross bars 14 and has side walls 23 and end walls 24 which are secured to the vertical bars 25. Said hopper has deflecting plates 26 the upper edges of which form a ridge which serve to deflect the plastic material laterally in opposite directions, the lower edges of the plates lying in the same plane as the side walls of the lower portion. The end part 27, which has its forward tapering edge disposed at an inclination, prevents any plastic material lodging under the plates and offers additional resistance to moving the apparatus. It will be noted that a cross section through the rear portion is of less area than one through the forward part, the difference being equal to the thickness it is desired to apply the plastic material.

Mounted upon the cross bar 28 which is supported in the side wall of the hopper is an agitator 29 which is substantially W-shape and secured to this agitator is an operating bar 30.

Fastened to the longitudinal bars 13 are the draft bars 31 to which are secured the draft chains 32 or, instead of the bar 31 and chains 32, the usual draft beam and clevis may be employed.

33 designates a reel mounted upon standards 34, and a reinforcing wire 35, adapted to be fed out of the reel and to be embedded within the concrete or cement, is provided, and anti-friction rollers 37, diagonally disposed, and a cast iron ball 38, mounted on standards 39, are positioned so that the wire may be guided as it is fed out.

In Fig. 6 of the drawings, I have shown a modification of my apparatus in which double frames, the parts of which are designated by numerals 50 and 51, are provided, one mounted upon the other and adapted to have hinged connections upon either longitudinal edge. The upper frame 50 is adapted to carry the engine 52 and boiler and a plurality of mixers, designated by numerals 53 and 54, in which the concrete is mixed and afterward dumped into the hoppers 55, are connected by gear connections with the shaft of the engine. A plurality of hoppers may be used. A reel 58 is mounted in suitable bearings upon the frame and about which a woven wire is adapted to be fed between the layers of concrete when the apparatus is used for reinforcing sidewalks, alleys or any form of surface in which it is desired to have the concrete reinforced.

By the provision of the modified form, it will be noted that the apparatus is reversible, adapting the machine for purposes of laying concrete in strips upon the sides of reservoirs, etc., and, by the hinge adjustment, the lower machine may be held at an inclination while the upper frame may be held level.

It will be understood that the lower portion of the hinged frame, which serves as a trough, may be formed in various ways to adapt itself to the contour of the wall which is to be coated with concrete.

In operation of the form adapted for use for laying ditches, reservoirs, etc., and as illustrated in Figs. 1 to 6 of the drawings, any suitable power may be employed for moving the device forward, the walls of the ditch being formed as the apparatus is moved forward. The plastic material to form the lining is fed into the hopper to be distributed along the sides of the ditch and afterward spread by the inclined surfaces following immediately in the rear of the hopper, thus making a smooth surface.

What I claim to be new is:—

1. A mortar or concrete spreading apparatus comprising a frame, a hopper for the reception of the plastic material, inclined plates spaced apart in the rear of said hopper, and an agitator in said hopper movable against the inclined bottom thereof.

2. A mortar or concrete spreading apparatus comprising a frame, a hopper for the reception of the plastic material, inclined plates spaced apart in the rear of said hopper, a rod passing through the walls of the hopper, a double angular-shaped agitating member pivotally mounted upon said rod, and an operating handle connected to said member.

3. A mortar or concrete spreading apparatus comprising a frame having its forward end tapering to a cutting edge, a hopper for the reception of the plastic material, means for delivering the same laterally from the center of the apparatus, and a spreading and smoothing device for applying the concrete to the surface being coated.

4. A mortar or concrete spreading apparatus comprising a frame with its forward end tapering to a cutting edge, a hopper for the reception of the plastic material, means for delivering the same laterally from the center of the apparatus, spreading and smoothing attachment for applying the concrete to the surface being coated, a reel, a reinforcing wire mounted thereon, and a rotatable ball mounted upon the frame and adapted to engage the wire and guide the same as it is fed out.

In testimony whereof I hereunto affix my signature in the presence of two witnesses.

GEORGE W. GALE.

Witnesses:
F. J. GREEN,
W. FRAVEL.